United States Patent [19]
Weber et al.

[11] Patent Number: 5,915,037
[45] Date of Patent: Jun. 22, 1999

[54] METHOD AND DEVICE FOR THE BINARIZATION OF PIXEL DATA

[75] Inventors: Wolfgang Weber, Radolfzoll; Eberhard Roehm; Andreas Banholzer, both of Singen; Walter Hesse, Constance, all of Germany

[73] Assignee: Licentia Patent-Verwaltungs GmbH, Frankfurt, Germany

[21] Appl. No.: 08/716,303

[22] PCT Filed: Mar. 31, 1995

[86] PCT No.: PCT/EP95/01209

§ 371 Date: Oct. 17, 1996

§ 102(e) Date: Oct. 17, 1996

[87] PCT Pub. No.: WO95/27364

PCT Pub. Date: Oct. 12, 1995

[30] Foreign Application Priority Data

Mar. 31, 1994 [DE] Germany ............... 44 11 248

[51] Int. Cl.⁶ .................. G06K 9/00; G06K 9/32; G06K 9/46; H04N 1/40
[52] U.S. Cl. .................. 382/181; 382/192; 382/194; 382/299; 358/445
[58] Field of Search ............... 382/181, 194, 382/217, 172, 273, 299, 192; 358/445

[56] References Cited

U.S. PATENT DOCUMENTS

| | | | |
|---|---|---|---|
| 4,675,909 | 6/1987 | Egami et al. | 382/172 |
| 4,747,149 | 5/1988 | Umeda et al. | 382/194 |
| 4,831,658 | 5/1989 | Umeda et al. | 382/217 |
| 4,916,744 | 4/1990 | Watanabe | 382/273 |
| 5,226,094 | 7/1993 | Eschbach | 382/299 |
| 5,253,080 | 10/1993 | Nishimura et al. | 358/445 |

*Primary Examiner*—Bipin H. Shalwala
*Assistant Examiner*—Daniel G. Mariam
*Attorney, Agent, or Firm*—Venable; George H. Spencer; Catherine M. Voorhees

[57] ABSTRACT

The invention concerns a method and device for binarization of pixel data in which a number of black-and-white binary images each having binarization characteristics of different degrees of sensitivity is formed from a set of grey scale value binary data. A dimension S is calculated for each of these binary images, according to the equation $$S = \frac{FS}{\ddot{U}}$$

where FS designates the number of black binary pixels and Ü designates the number of black-and-white transitions. A selection of the binary image for which the dimension S is at its maximum is optimally carried out.

8 Claims, 6 Drawing Sheets

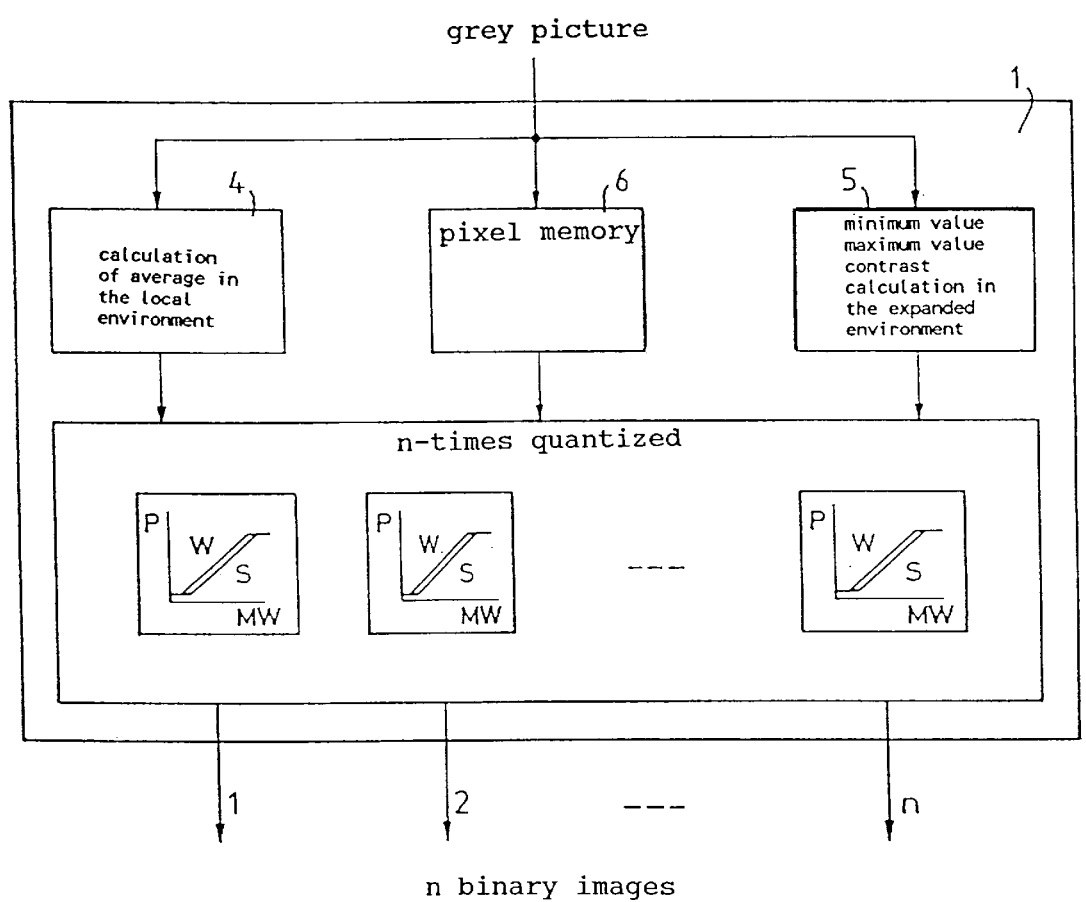

column + line direction    column direction    line direction

S = 1,19

S = 1,48

S = 1,87

S = 1,64

METHOD AND DEVICE FOR THE BINARIZATION OF PIXEL DATA

BACKGROUND OF THE INVENTION

The invention at hand concerns a method and a device for the binarization of pixel data.

The invention at hand relates to the field of image preparation for automatic character recognition systems. Character recognition systems can be divided roughly into two partial systems, of which the first serves the purpose of picture preparation and the second is used for the actual recognition. During the image preparation, the document to be recognized, the so-called original, is acquired with measuring techniques. For an image of the original, text passages, lines and finally individual characters are prepared and the developing character images freed of obviously recognizable defects. The characters to be recognized initially appear in the optical range and must be converted so that they are suitable for further processing. This is done with a scanner, and these days preferably with an integrated semiconductor scanner. For further processing, the continuously measured blackening of the original is generally converted immediately after the scanning to a black-and-white decision. It is preferable if the analog signal furnished by the scanner is initially converted to a discrete signal with the aid of an analog-digital converter and, subsequently, a binary image of this grey picture original is produced, which shows the image content sufficiently well for the character recognition. Background brightness and blackening in the character area can be subject to strong fluctuations. While we can expect slight fluctuations for the background brightness in the respectively interesting subregions of the original, the blackening in the character range frequently changes from character to character and even within the individual characters. Differences in the background brightness are therefore picked up by a control that is uniform for larger image cutouts, while differences in the character blackening are compensated for by a more locally active control.

The local control of the black-and-white contrast according to a binarization characteristic curve is a differentiating operation, which, in order to reach a decision concerning a pixel blackening, uses not only its grey scale value, but also the grey scale values for the surrounding region. The dimensions for the surrounding region here must be selected in accordance with the dimensions for the characters to be recognized. It is easiest to determine initially the average blackening in the surrounding region and to call a pixel black if it is blacker than the average blackening, or otherwise call it white. For the noise suppression in the area of the character background as well as the character blackening, it is also advantageous to use a binarization characteristic curve, which raises the threshold value Q in the range of low average blackening and lowers it in the range of higher average blackening. For a more strongly fluctuating character contrast, it can be advisable to control the binarization characteristic curve on the whole based on the contrast observed in a larger surrounding region and to use a binarization characteristic curve for strong print that differs from the one for weak print.

The user information for all successive processing steps is generated in the above-described binarization step of the picture preparation. Thus, any information lost at this point influences all further processing steps and restricts the productive capacity of the total system.

One problem occurring with binarization is that with a sensitive binarized picture, which has been processed with a binarization characteristic curve designed for weak printed characters, low-contrast characters can be recognized easily, but interfering structures and patterns also appear clearly. With a non-sensitive binarized picture, on the other hand, contrast-rich characters are shown clearly while interfering information and background noise are suppressed. Difficulties occur in this connection in particular with address fields, which have a structure to back up the background. In cases like these, it is hardly possible to conclude from the local observation of the region surrounding the grey picture whether a blackening is caused by written text or an interfering background pattern.

SUMMARY OF THE INVENTION

It is the object of the invention at hand to provide a method and a device for selecting an optimum binarized picture from a number of binary images that are each formed with different binarization characteristic curves.

The solution according to the invention is achieved by forming a number of black-and-white binary images with binarization characteristic curves of a varied degree of sensitivity from a respective set of grey scale pixel data; calculating a dimension for each of the formed binary images according to the equation $$S = \frac{FS}{\ddot{U}}$$

where FS designates the number of black binary dots and $\ddot{U}$ the number of black-and-white transitions; and selecting an optimal binary image from the formed binary images according to the calculated dimension S where the optimal binary image has the maximum dimension S.

The inventive device for the binarization of pixel data includes a binary data source from which a set of grey scale pixel data is delivered from a number (1–n) of black-and-white binary images with binarization characteristic curves of varied sensitivity; analyzing equipment for forming a dimension for each of the n binary data images according to the equation $$S = \frac{FS}{\ddot{U}}$$

where FS represents the number of black binary image dots and $\ddot{U}$ the number of black-and-white transitions; and evaluation equipment for selecting the image with the maximum dimension S from the number of binary data images.

Advantageous embodiments of the invention can be taken from the detailed description.

BRIEF DESCRIPTION OF THE DRAWINGS

The invention is explained in more detail in the following with the aid of drawings in which

FIG. 2 is a block diagram for a binary data source, which supplies a number of n black-and-white binary images;

DETAILED DESCRIPTION OF THE INVENTION

Figure 1:
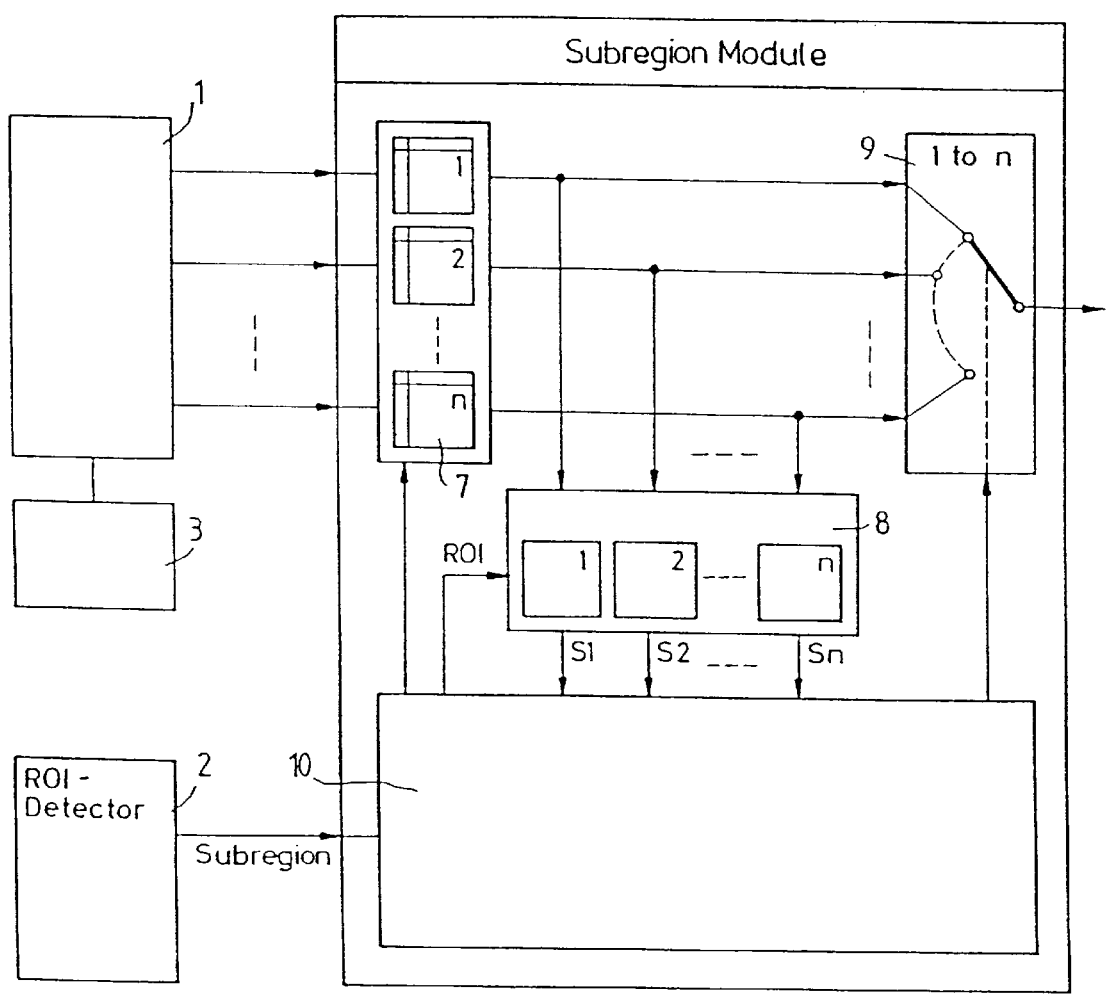
FIG. 1 is a block diagram for a device according to the invention.

The block diagram displayed in FIG. 1 of a device according to the invention shows a binary data source 1 and a ROI detector module 2 for supplying predetermined subsets of binary image dots, that is regions of interest (ROI). As shown in FIG. 2, n binary images—typically four to six—are generated in parallel in the binary data source 1. The binary data source 1 obtains pixel data for the grey picture from a grey scale pixel data source, which is not shown in detail, in particular image input unit 3, e.g. a scanner. A sequential generating of n binary images is also possible in principle with the device according to the invention.

The n binary images each have different binarization characteristic curves. As is already known, an averaging is carried out in the local environment of each pixel in block 4 for the binarization of a grey picture. The local environment is parameterizable in its expansion. The field size of 1 mm$^2$ is considered empirically suitable for written text in the address field of letters. The average value is preferably formed as the arithmetic average grey scale value of all or one representative subset of the picture dots in the local environment, wherein the picture dot to be binarized is in the center of the local environment.

Minimum value, maximum value and contrast 5 are determined in block 5 as further measured data for the binarization from an expanded environment that is preferably located symmetrical around the picture dot to be binarized. In this case, the darkest grey scale value in the expanded environment is allocated the minimum value MIN. The maximum value MAX$_{abs}$ is preferably allocated to the absolutely brightest grey scale value in the expanded environment. In order to calculate the contrast, the absolute minimum value MAX$_k$ is preferably determined from sub-maxima. For an environment that is expanded 3×3, for example, from three columns sub-maxima.

The contrast must then be determined as follows:

$$K = \frac{MAX_K - MIN}{MAX_K}$$

Through this determination of K by means of MAX$_K$ the influence of the grey picture maximum value on the contrast and thus on the binarization result is slowed down. Bright outliers in the grey picture as well as edge transitions, which occur for example with labels or see-through windows on letters, would otherwise result in a change of contrast that is too strong. A noticeable contrast change should, however, be caused only by the written text.

Each picture dot of the grey picture is stored temporarily in the pixel memory 6 until average value, minimum value, MAX$_K$ and contrast have been calculated for this dot.

The measured data minimum value, maximum value and contrast preferably can be determined at the same time for all pictures n. In that case, the binary images differ only by the additional parameters of the decision diagram shown in the following, FIG. 3.

Figure 3:
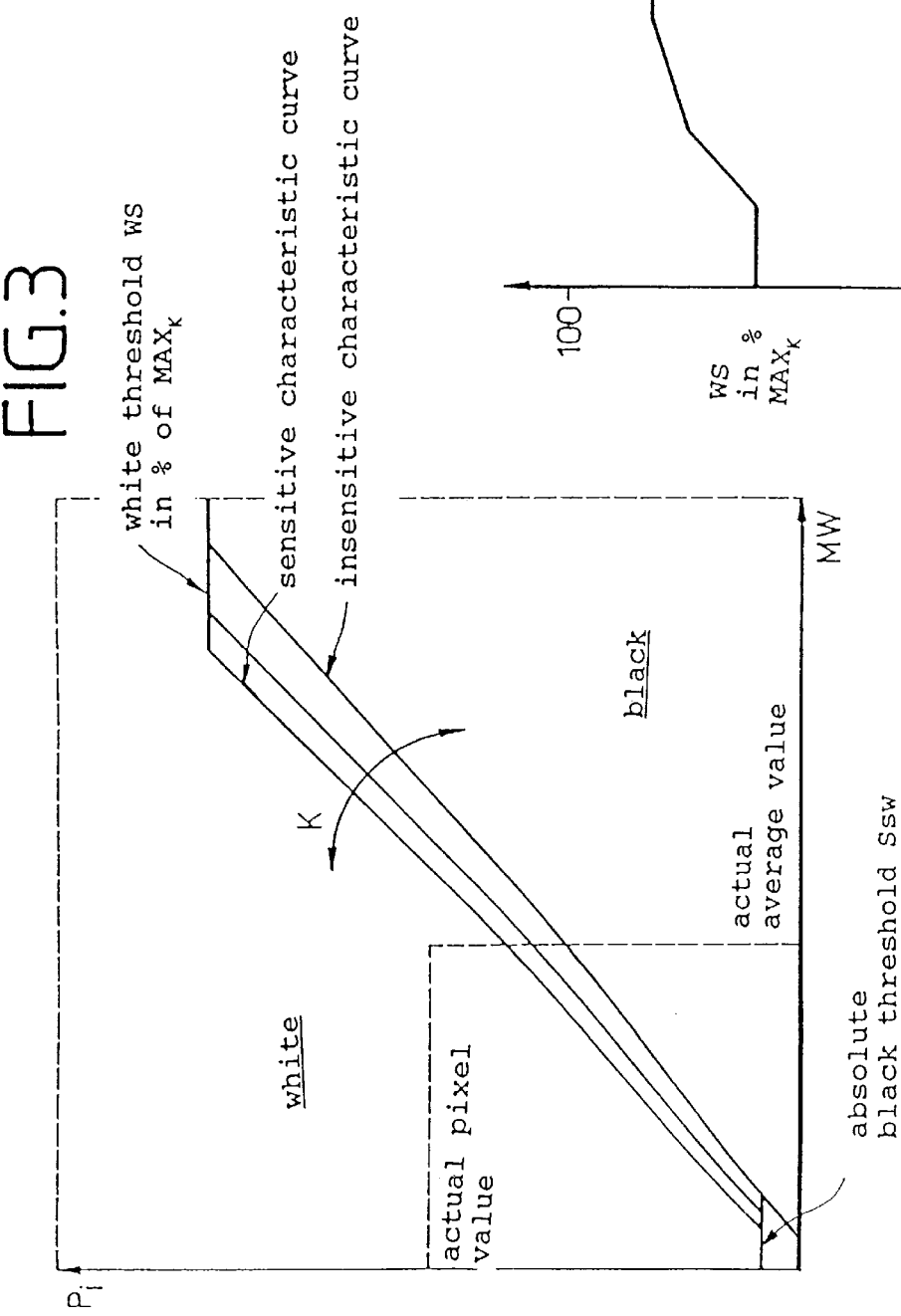
FIG. 3 is a binarization decision diagram.

In the decision diagram, the actual average value is plotted on the abscissa and the actual pixel value on the ordinate for each pixel P$_i$ to be binarized. Three different characteristic curves are shown in FIG. 3, wherein the binarization sensitivity increases with the increasing steepness of the linear portion. The value "white" is assigned above the characteristic curve for a given pixel with a given average value and the value "black" is assigned below the characteristic curve. In general, a sensitive characteristic curve is selected for a weak contrast and an insensitive characteristic curve for a strong contrast.

Various thresholds are introduced in FIG. 3 for the noise suppression:

The white threshold WS is given in dependence on MAX$_K$. The white threshold lies typically in the range of 70–85% MAX$_K$. If the actual pixel value P$_i$ is higher than this threshold, it becomes white, independent of the characteristic curve.

The absolute black threshold SSW causes the pixel value P$_i$ to be set to black if it is lower than the absolute threshold.

Figure 4:
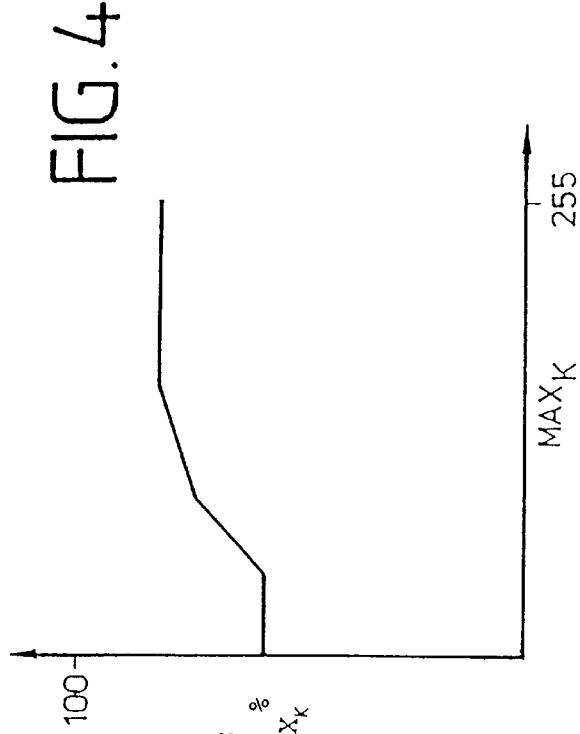
FIG. 4 is a diagram illustrating dynamic noise threshold.

Owing to the fact that very dark address fields generally cause a stronger white noise than brighter ones, it is advantageous to introduce a dynamic white noise threshold WS=f (MAX$_K$), which suppresses the white noise more or less strongly, depending on the maximum value for the pixels MAX$_K$. FIG. 4 shows an example for such a dynamized white threshold, wherein a value range of 8 bit was assumed for the grey scale values.

In accordance with the invention, n different characteristic curves were used for binarization, preferably arranged according to sensitivity, which result in n different, binarized binary images. These n images are fed to a mapped memory 7, which provides regions of interest (ROI) for the analyzing device 8 as well as total images for the assembler 9.

Figure 5:
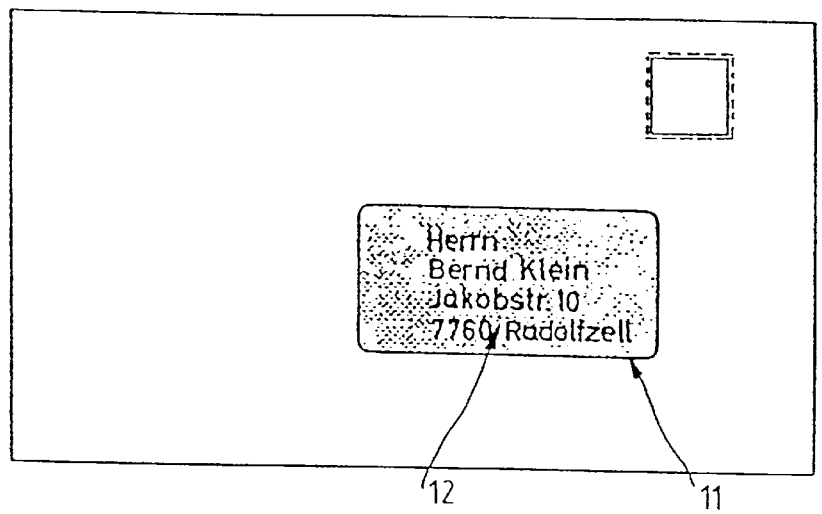
FIG. 5 is an example for regions of interest (ROI) on a letter.

FIG. 5 shows an example of an original with a region of interest 11, which contains an address block 12. The regions of interest can on principle be produced by various detectors, e.g. by a window detector, which determines on letters with a see-through window the coordinates from a glossy picture that is obtained with a special scanner; a label detector that searches for address labels; a detector for the address block search, which searches with algorithms for the line structure and marks address-typical structures as interesting subregions; a color information detector, which determines an interesting subregion through color analysis; or a constant zone detector, which determines an interesting subregion via predetermined, fixed coordinates.

In the analyzer equipment 8, the dimensions S1, S2, . . . , Sn are computed for each of the binary images 1 to n for a region of interest, which is determined by the ROI detector module 2.

In order to determine the dimension S, the number of black image dots FS and the number of the black-and-white or white-and-black transitions Ü is calculated.

The dimension S is defined as $$S = \frac{FS}{\ddot{U}}$$

Figure 6:
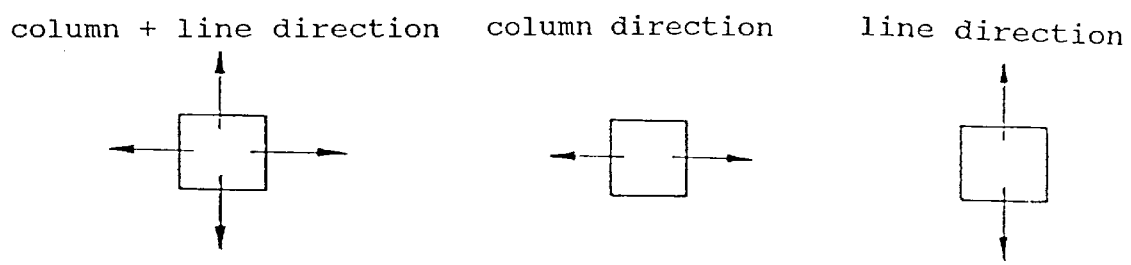
FIG. 6 illustrates counting directions for determining black-and-white transitions.

For the determination of Ü, the number of transitions can be counted by pixel either in the column direction or the line direction or in both directions. FIG. 6 shows the column and line direction as counting directions for determining the transitions between column and line direction.

Figure 7:
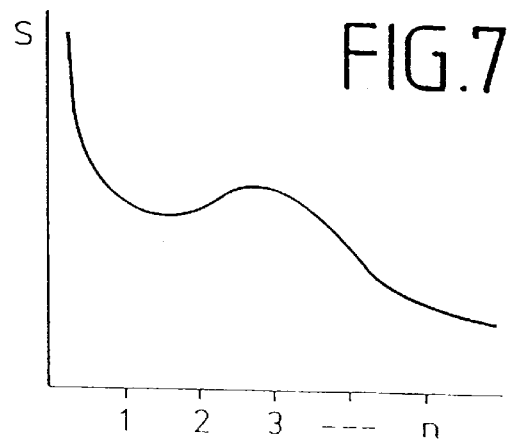
FIG. 7 is an evaluation diagram.
Figure 8A:
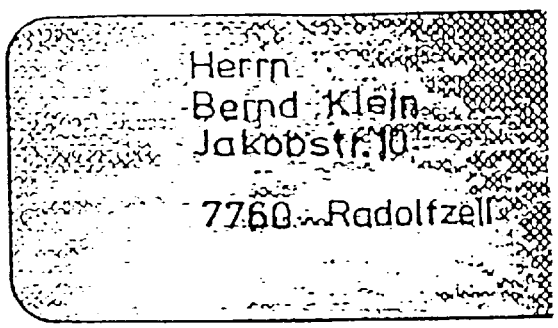
FIG. 8 is a sequence of differently binarized images.
Figure 8B:
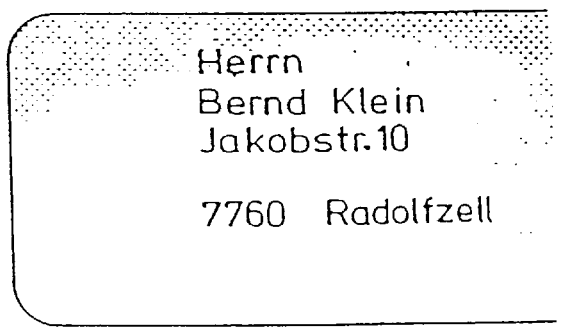
Figure 8C:
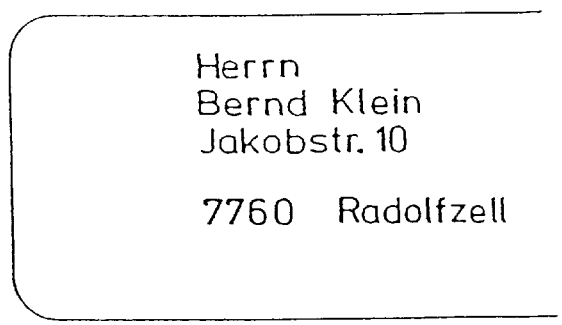
Figure 8D:
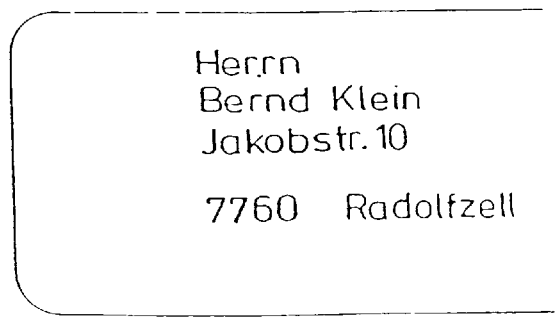

If the dimension S is plotted for binary images that are binarized with a decreasingly sensitive characteristic curve, then the curve course shown in FIG. 7 is obtained. S has very high values for a very sensitive binarized characteristic curve. The coordinated binary image is practically black with relatively few black-and-white transitions. The black-and-white transitions increase strongly with decreasing sensitivity, which leads to a drop in S. S increases again with a continued decrease in the sensitivity of the binarization characteristic curve because the text information now appears clear and distinct. With a further decrease in the sensitivity of the binarization characteristic curve, the characters in the binarized image continue to disintegrate, so that the dimension S drops again. As a result, the curve course for S has a relative maximum for the optimum recognizable image.

For a sequence of four images in an address field range, their respective visual representation for varied binarization characteristic curves and the coordinated value for dimension S are shown in FIG. 8. It turns out in this case that the clearest visual picture (C) is the one with the maximum value S (S=1.87).

The dimensions S1 to Sn, provided by the analyzer equipment 8, are processed further in the evaluation equipment 10, meaning the relative maximum is determined from the dimensions S1 to Sn and the assembler 9 is controlled such that in the range of the subregion of interest, the binary image is output with the maximum S while a standard image is output for the remaining picture. One of the n binary images is used as the standard image, which is adapted to the expected surface of the original. It is self-evident to the expert that the assembly in the assembler 9 can also be dispensed with and that in this case, the total binary image can be output with the binarization characteristic curve that leads to a maximum of S. However, because subregions of interest frequently have optical characteristics that differ from the total original surface, it is advantageous to divide and subsequently assemble the total image of the original.

Figure 9:
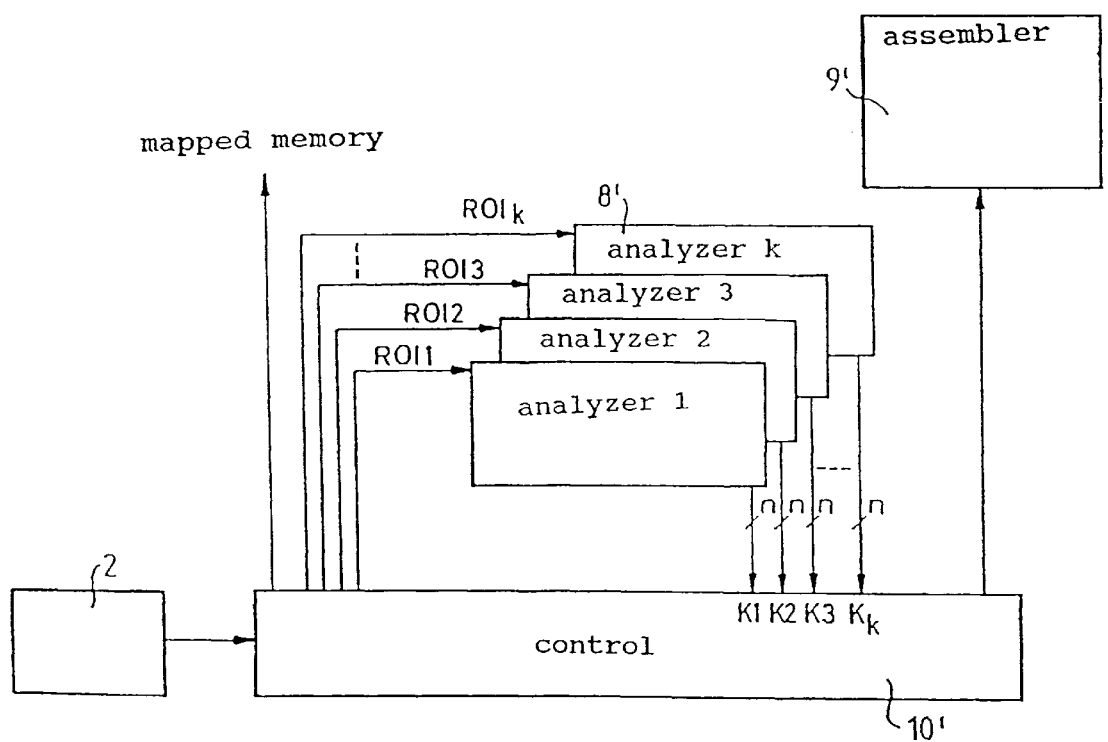
FIG. 9 is a block diagram of another device according to the invention.

For originals with several subregions of, interest ROI, for example letters with several see-through windows or flats with labels, it is possible to expand the invention to include originals with several subregions of interest. For K subregions of interest, the analyzing equipment is preferably realized K-times for this. FIG. 9 shows an embodiment of the invention with K analyzers 8', each of which delivers n dimensions S1 to Sn, as described above. Thus, for each subregion of interest, a separate evaluation is made in the coordinated analyzer. This achieves that for each subregion of interest, an optimally recognizable binary image is detected, which is issued during the assembly. FIG. 9 shows that the ROI detector module 2 supplies data on subregions of interest ROI1 to ROIK to control 10', which are fed to analyzers 8' for evaluation. The assembler 9' is controlled by controller 10'. Any overlapping of subregions that are reported by different ROI detectors, are eliminated by prioritizing the different ROI detectors, so that only unambiguous subregions exist for the analyzers and the assembler.

We claim:

1. A method for binarization of pixel data comprising the steps of:

(a) forming a number of black-and-white binary images with binarization characteristic curves of a varied degree of sensitivity from a respective set of grey scale pixel data;

(b) calculating a dimension S for each of the formed binary images according the equation $$S = \frac{FS}{\ddot{U}}$$

where FS designates the number of black binary dots and $\ddot{U}$ the number of black-and-white transitions; and (c) selecting an optimal binary image according to the calculated dimension S where the optimal binary image has the maximum dimension S of the formed binary images.

2. A method according to claim 1, wherein the calculation step to determine the dimension S and the corresponding selection for each image is made only for one or several predetermined subsets (ROI) of binary image dots.

3. A method according to claim 2, wherein several subsets (ROI) are predetermined based on varied criteria.

4. A method according to claim 2, wherein the subsets (ROI) and a correlated residual image are assembled to form a total image with a preset standard binarization characteristic curve.

5. A method according to claim 1, wherein the characteristic curve for binarization has the parameters average value, minimum value, maximum value, contrast as well as preset noise thresholds for the noise suppression of the grey scale pixel data.

6. A device for binarization of pixel data comprising a binary data source, the binary data source delivering from a set of grey scale pixel data a number (1–n) of black-and-white binary images with binarization characteristic curves of varied sensitivity, analyzing equipment forms a dimension for each of the n binary data images according to the equation $$S = \frac{FS}{\ddot{U}}$$

wherein FS represents the number of black binary image dots and $\ddot{U}$ the number of black-and-white transitions, and evaluation equipment which selects from the number of binary data images the image with the maximum dimension S.

7. A device according to claim 6, further comprising a mapped memory in which the n binary data images are stored temporarily and analyzing equipment, the data being fed from the mapped memory to the analyzing equipment.

8. A device according to claim 6, further comprising a detector module for selecting a predetermined subset (ROI) of binary data dots.

* * * * *